United States Patent
Kawachi

(10) Patent No.: US 7,791,650 B2
(45) Date of Patent: Sep. 7, 2010

(54) IMAGE DATA RECORDING APPARATUS AND METHOD

(75) Inventor: Shuhei Kawachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 723 days.

(21) Appl. No.: 11/462,493

(22) Filed: Aug. 4, 2006

(65) Prior Publication Data
US 2007/0036524 A1 Feb. 15, 2007

(30) Foreign Application Priority Data
Aug. 12, 2005 (JP) .............................. 2005-234746

(51) Int. Cl.
*H04N 5/76* (2006.01)
(52) U.S. Cl. .................................................. 348/231.1
(58) Field of Classification Search .............. 348/231.1, 348/231.9, 231.99
See application file for complete search history.

(56) References Cited

U.S. PATENT DOCUMENTS 6,738,092 B1 * 5/2004 Nakagawa et al. ........ 348/231.3
2005/0012829 A1 * 1/2005 Tashiro et al. .......... 348/231.99

FOREIGN PATENT DOCUMENTS

| JP | 06-139143 A | 5/1994 |
| JP | 2000-267904 | 9/2000 |
| JP | 2003-346418 A | 12/2003 |

\* cited by examiner

*Primary Examiner*—David L Ometz
*Assistant Examiner*—Akshay Trehan
(74) *Attorney, Agent, or Firm*—Canon U.S.A., Inc., IP Division

(57) ABSTRACT

Information regarding free space on a recording medium is acquired. The free space is classified into a plurality of classes according to a writing speed. Then, image data is recorded at predetermined position on the recording medium determined on the basis of a bit rate of the image data to be recorded and the classified class.

17 Claims, 7 Drawing Sheets

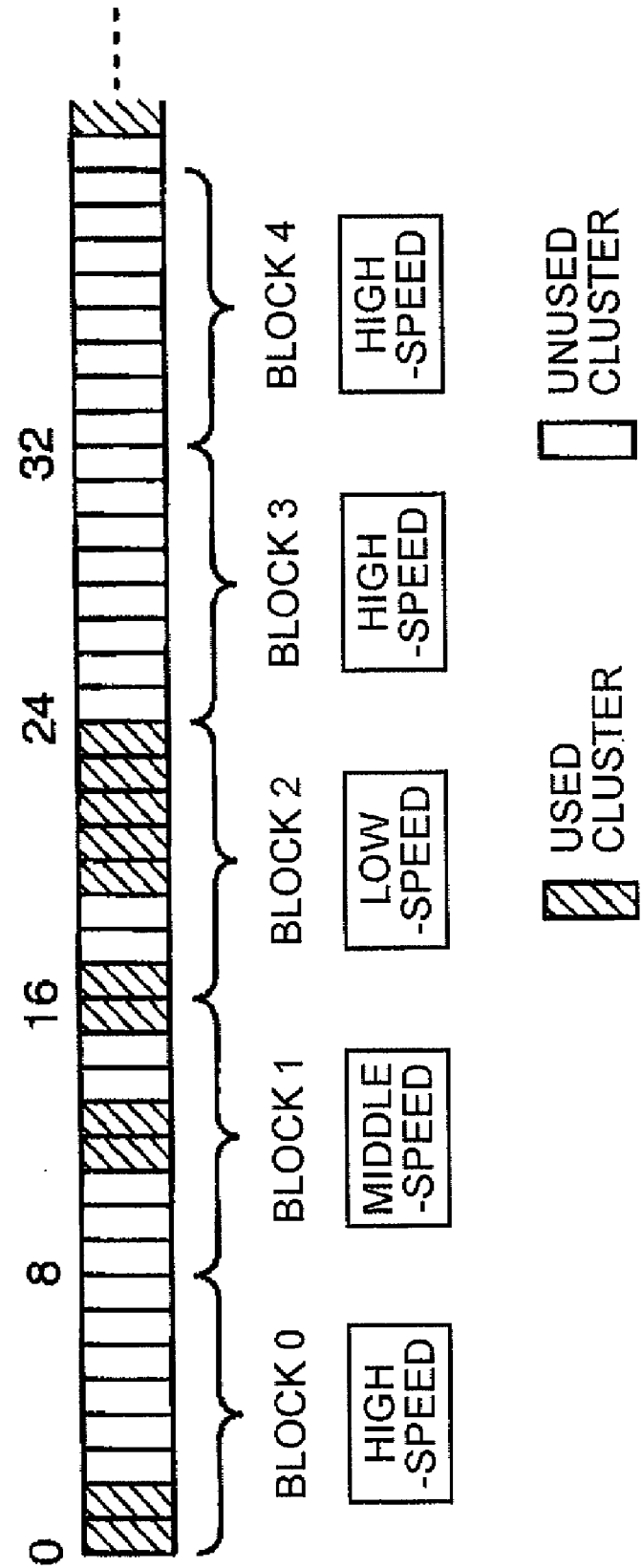

FIG. 6A

| LOW -SPEED | MIDDLE -SPEED | MIDDLE -SPEED | LOW -SPEED | HIGH -SPEED | HIGH -SPEED | HIGH -SPEED | HIGH -SPEED | HIGH -SPEED |

FIG. 6B  (PRIOR ART)

| LOW -SPEED | MIDDLE -SPEED | MIDDLE -SPEED | LOW -SPEED | HIGH -SPEED | HIGH -SPEED | HIGH -SPEED | HIGH -SPEED | HIGH -SPEED |

FIG. 6C

| LOW -SPEED | MIDDLE -SPEED | MIDDLE -SPEED | LOW -SPEED | HIGH -SPEED | HIGH -SPEED | HIGH -SPEED | HIGH -SPEED | HIGH -SPEED |

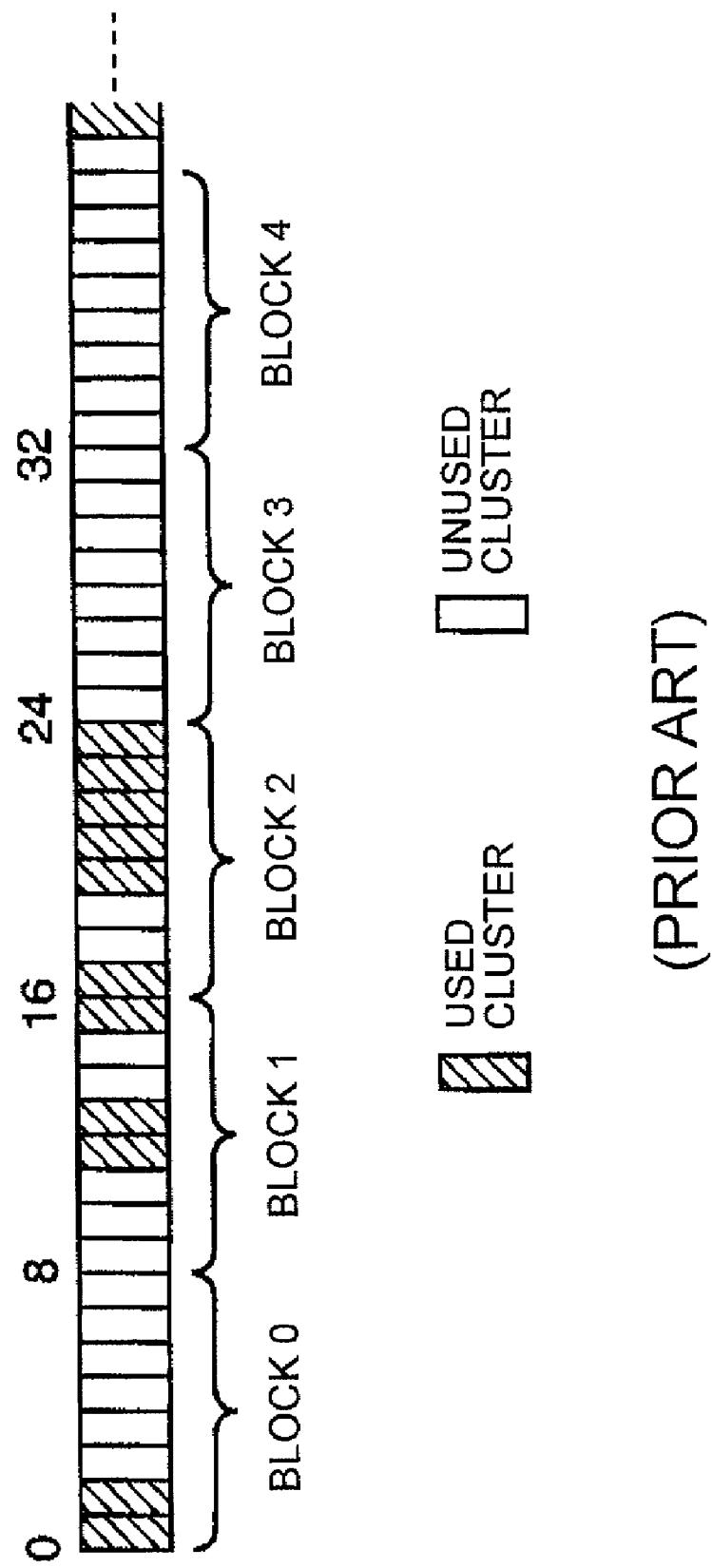

| STARTING CLUSTER NUMBER | NUMBER OF CLUSTERS |
|---|---|
| 2 | 6 |
| 8 | 3 |
| 13 | 2 |
| 17 | 2 |
| 24 | 8 |
| 32 | 8 |
| 40 | 1 |

| STARTING CLUSTER NUMBER | NUMBER OF CLUSTERS |
|---|---|
| 40 | 1 |
| 13 | 2 |
| 17 | 2 |
| 8 | 3 |
| 2 | 6 |
| 24 | 8 |
| 32 | 8 |

(PRIOR ART)

IMAGE DATA RECORDING APPARATUS AND METHOD

BACKGROUND OF THE INVENTION

1. Field of the Invention

The present invention generally relates to image data recording apparatuses and image data recording methods for recording movies and still images. More particularly, though not exclusively, the present invention relates to an image data recording apparatus and an image data recording method that use different write spaces on a data recording medium to record image data.

2. Description of the Related Art

Recently, digital cameras and digital video cameras that record movies and still images on recording media, such as flash memory cards, have been widely used. Some of these electronic apparatuses adopt the FAT (File Allocation Table) system to record data on a recording medium. The FAT system manages used spaces and unused spaces on a recording medium using a table. In response to a data write request, the electronic apparatuses determine the unused spaces in which new data is written according to the table, and write the data in the determined unused spaces.

However, in the FAT system, repetition of file write and file delete operations mixes up the used spaces and the unused spaces. As a result, a circumstance where successive free spaces undesirably decrease (i.e., fragmentation) occurs. The presence of the fragmentation decreases the speed of a write operation. Therefore, the fragmentation is undesirable to record movies requiring real-time processing. Thus, the digital cameras and digital video cameras mentioned above may have such fragmentation caused by repetition of the write and delete operations on the memory card.

An earlier application of Japanese Patent Laid-Open No. 2000-267904 suggested a solution to the above-described problem. In this solution, whether the data to be recorded requires the real-time processing or not is a parameter that is determined first. According to free-space information of a recording medium, movie data requiring real-time processing is recorded in blocks with a high transfer rate. On the other hand, according to the free-space information of the recording medium, still image data not requiring real-time processing is recorded in blocks with a low transfer rate.

Now, features of an invention described in the above-cited Japanese Patent Laid-Open No. 2000-267904 are described more specifically. First, the data recording apparatus finds out the numbers of used clusters and unused clusters on a block-by-block basis (see FIG. 7A and FIG. 7B). The data recording apparatus sorts the blocks in ascending order of the number of unused clusters, and manages the result as the free-space information of the recording medium. On the basis of this free-space information, the data recording apparatus uses different blocks depending on the types of data to be recorded, i.e., movie data or still image data (see FIG. 7C).

However, in the configuration according to the invention of Japanese Patent Laid-Open No. 2000-267904 described above, all the movie data is written in the blocks with a high transfer rate, therefore the blocks with a high transfer rate may be unnecessarily used. As a result, the recordable time for the blocks with a high transfer rate rapidly decreases.

In light of the aforementioned, it becomes difficult to record long movies or the like. In addition, since the price-per-bit of memory cards used by image data recording apparatuses is significantly expensive, the efficient utilization of memory cards is desired.

SUMMARY OF THE INVENTION

According to an aspect of the present invention, an image data recording apparatus is provided which includes a recording medium information acquiring unit configured to acquire information regarding free space on a recording medium, a classifying unit configured to classify the free space into a plurality of classes according to a writing speed, and a recording unit configured to record image data at predetermined position on the recording medium determined on the basis of a bit rate of the image data to be recorded and the class classified by the classifying unit.

According to another aspect of the present invention, the classifying unit classifies the free space into at least three classes. According to another aspect of the present invention, the classifying unit classifies the free space into low-speed, middle-speed, and high-speed classes.

Moreover, according to yet another aspect of the present invention, the recording unit preferentially records still image data in a free space in the class classified as low-speed. And according to yet another aspect of the present invention, the recording unit preferentially records movie data in a free space in the class classified as middle-speed. Further, according to yet another aspect of the present invention, the recording unit changes the recording position of the image data as a bit rate of movie data changes.

Additionally, according to yet another aspect of the present invention, an image data recording apparatus is provided which includes a recording medium information acquiring unit configured to acquire information regarding free space on a recording medium, a classifying unit configured to classify the free space into a plurality of classes according to a writing speed, and a recording unit configured to record image data at predetermined position on the recording medium determined on the basis of an image quality mode set for the image data to be recorded and the class classified by the classifying unit.

Moreover, according to yet another aspect of the present invention, the classifying unit classifies the free space into at least three classes. Furthermore, according to another aspect of the present invention, the classifying unit classifies the free space into low-speed, middle-speed, and high-speed classes.

Also, according to another aspect of the present invention, the recording unit preferentially records movie data in a free space in the class classified as middle-speed. Furthermore, according to another aspect of the present invention, the recording unit changes the recording position of the image data as the image quality mode changes.

According to yet another aspect of the present invention, the apparatus may further include an image capturing unit configured to capture a subject and generate the image data, and a setting unit configured to set the image quality mode for the image data captured by the image capturing unit, wherein the recording unit records the captured image data at predetermined position on the recording medium determined on the basis of the image quality mode set for the captured image data and the class classified by the classifying unit.

Additionally, according to another aspect of the present invention, an image data recording method is provided which is utilized in an image data recording apparatus. Here, the method includes acquiring information regarding free space on a recording medium, classifying the free space into a plurality of classes according to a writing speed, and recording image data at predetermined position on the recording medium determined on the basis of a bit rate of the image data to be recorded and the class classified in the classifying step.

Furthermore, according to another aspect of the present invention, an image data recording method is provided which may be utilized in an image data recording apparatus. Here, the method includes acquiring information regarding free space on a recording medium, classifying the free space into a plurality of classes according to a writing speed, and recording image data at predetermined position on the recording medium determined on the basis of an image quality mode set for the image data to be recorded and the class classified by the classifying step.

And moreover, according to yet another aspect of the present invention, a computer-readable medium is provided which contains computer-executable instructions for recording image data utilized in an image data recording apparatus. Here, the medium includes computer-executable instructions for acquiring information regarding free space on a recording medium, computer-executable instructions for classifying the free space into a plurality of classes according to a writing speed, and computer-executable instructions for recording image data at predetermined position on the recording medium determined on the basis of at least one of an image quality mode set for the image data to be recorded, a bit rate of the image data to be recorded, and the class classified in the classifying step.

Additionally, according to another aspect of the present invention, an image data recording apparatus is provided which includes a recording medium information acquiring unit configured to acquire information regarding free space on a recording medium, a determining unit configured to determine predetermined position on the recording medium on the basis of the information and a bit rate of the image data to be recorded, and a recording unit configured to record image data at the determined recording position on the recording medium.

Furthermore, according to another aspect of the present invention, an image data recording method is provided which may be utilized in an image data recording apparatus. Here, the method includes acquiring information regarding free space on a recording medium, determining recording position on the recording medium on the basis of the information and a bit rate of the image data to be recorded, and recording image data at the determined recording position on the recording medium.

Further aspects and features of the present invention other than those described above will become apparent from the following description of exemplary embodiments with reference to the attached drawings.

BRIEF DESCRIPTION OF THE DRAWINGS

FIG. 5 is an example of a classification of writing speed classes according to an aspect of the present invention.

FIG. 6A shows a state of a recording medium before recording a movie.

FIG. 6B shows an example of a state of a recording medium after recording a movie according to a known method.

FIG. 6C shows an example of a state of a recording medium after recording a movie according to an aspect of the present invention.

FIGS. 7A, 7B, and 7C illustrate a cluster management method according to conventional methods.

DESCRIPTION OF THE EMBODIMENTS

Exemplary embodiments, features and aspects of the present invention will now herein be described below with reference to the drawings.

Figure 1:
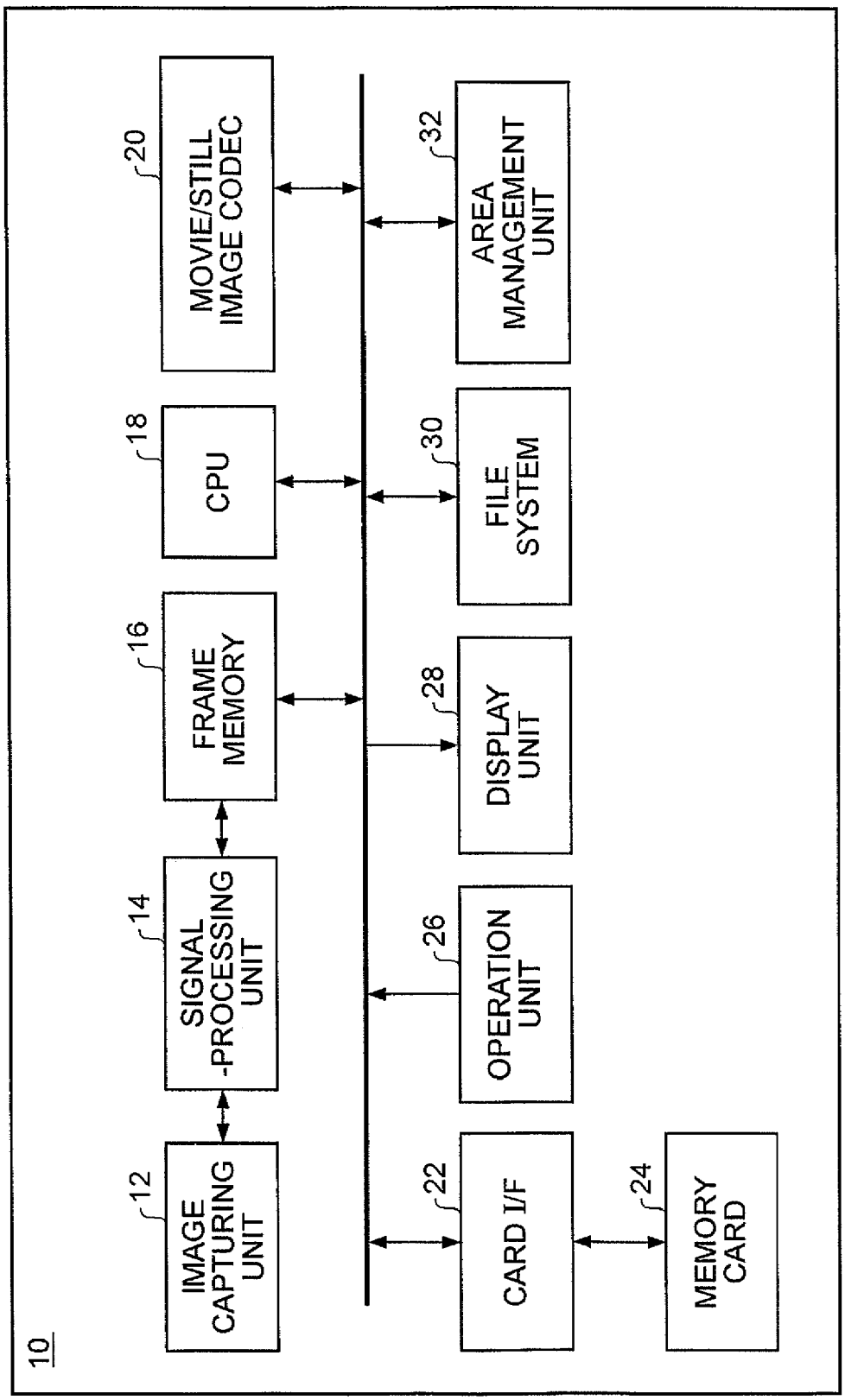
FIG. 1 is a schematic configuration block diagram of an exemplary digital camera according to an aspect of the present invention.

FIG. 1 is a schematic configuration block diagram of a digital camera according to an exemplary embodiment of the present invention. The digital camera 10 includes an image capturing unit 12, a signal-processing unit 14, a frame memory 16, a central processing unit (CPU) 18, a movie/still image codec (Encoder and Decoder) 20, a card interface (I/F) 22, a memory card 24 (or another recording medium), an operation unit 26, a display unit 28, a file system 30, and an area management unit 32.

The image capturing unit 12 includes a charged couple device (CCD) image sensor or a CMOS (Complementary Metal Oxide Semiconductor) image sensor or the like. The image capturing unit 12 converts an optical image of a subject into an electric signal. The signal-processing unit 14 includes an A/D (Analog-to-Digital) converter (not shown). The signal-processing unit 14 converts the image signal supplied from the image capturing unit 12 into digital image data. The frame memory 16 buffers the digital image data supplied from the signal-processing unit 14 on a frame-by-frame basis. The CPU 18 controls the entire system of the digital camera 10. The movie/still image codec 20 compresses and encodes the digital image data stored in the frame memory 16, and decompresses and decodes compressed image data read from the memory card 24 via the card I/F 22.

Further, the card I/F 22 writes and reads data to and from the memory card 24. The memory card 24 may be a nonvolatile memory (e.g., flash memory). The memory card 24 works according to the FAT (File Allocation Table) system, and records digital data thereon. The digital data to be recorded includes the compressed encoded image data and management data. The memory card 24 also includes registers for maintaining information on, for example, write performance and fragmentation.

The operation unit 26 includes buttons/keys or dial switches. Users use the operation unit 26 to instruct the CPU 18 to perform operations such as recording and playback. The display unit 28 displays the subject images captured by the image capturing unit 12 or playback images of the image data stored in the memory card 24. The display unit 28 also displays menu screens of various settings in a movie recording mode, a still image recording mode, etc.

Moreover, the file system 30 complies with the FAT system, and controls a writing operation of the digital data to the memory card 24 during the recording and a reading operation of the digital data from the memory card 24 during the playback. The area management unit 32 includes a memory (not shown). The area management unit 32 sorts the number of clusters in the file system on the memory card 24, and manages the number of clusters on the block-by-block basis. That is, the area management unit 32 serves as a file allocation table of the memory card 24.

Figure 2:
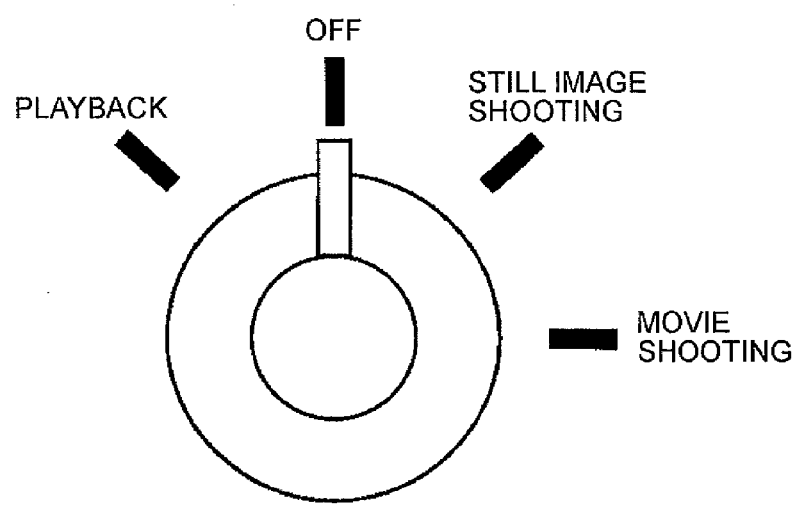
FIG. 2 is a configuration diagram of an exemplary mode selection switch according to an aspect of the present invention.
Figure 3:
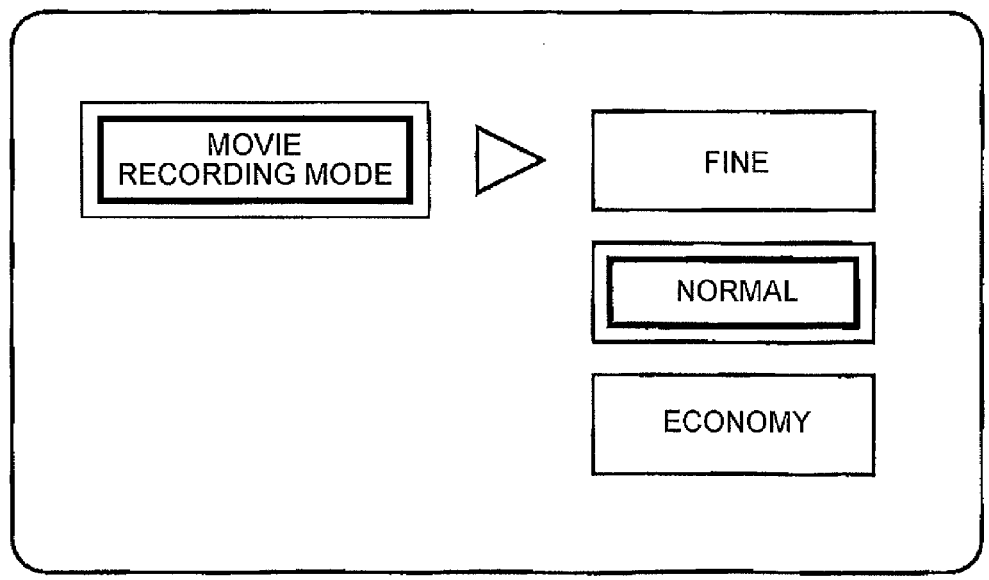
FIG. 3 is an example menu screen of a bit rate setting in a movie recording mode according to an aspect of the present invention.

Now, referring to FIG. 2 and FIG. 3, explanations of an operation mode switch and a bit rate setting will be given. FIG. 2 is a configuration diagram of a mode selection switch (also referred to as "operation mode switch") provided in the operation unit 26. FIG. 3 is an example menu screen of the bit rate setting in a movie recording mode.

As shown in FIG. 2, the operation mode switch provides operation options, for example, "OFF (i.e., power off)", "PLAYBACK (i.e., image playback mode)", "STILL IMAGE SHOOTING (i.e., still image recording mode)", and "MOVIE SHOOTING (i.e., movie recording mode)". By switching the operation mode switch shown in FIG. 2, the user can turn off the digital camera 10, play back and display the image data stored in the memory card 24, or record still images or movies on the memory card 24. Further, the example of FIG. 2 shows the movie shooting mode and still image shooting mode separately. However, pressing a shutter button while shooting the movie may also enable the shooting of still images at desired timings.

Additionally, when the move shooting mode (i.e., movie recording mode) is selected with the operation mode switch, an exemplary menu screen as shown in FIG. 3 for setting the bit rate is accessible. Likewise, when the still image shooting mode (i.e., still image recording mode) is selected with the operation mode switch, a menu screen for setting data compression rate, image quality, and/or the number of pixels is accessible.

On the bit rate setting screen shown in FIG. 3, three kinds of mode (hereinafter, referred to as "image quality mode"), namely, "FINE", "NORMAL", and "ECONOMY", are selectable. In these image quality modes, the image quality, the number of pixels, and/or the data rate differs. In "FINE", "NORMAL", and "ECONOMY" modes, the movie is recorded on the memory card 24, for example, at 8 Mbps, 4 Mbps, and 2 Mbps, respectively. The "NORMAL" image quality mode is set as the default setting in the movie recording mode. An operation of a menu button provided in the operation unit 26 invokes the setting screen of FIG. 3 for changing the bit rate of the movie to be recorded. This setting screen is configured to be freely switchable to other screens. Additionally, as in the case of the movie recording mode, a plurality of recording modes having different data compression rates, image qualities, and/or numbers of pixels are selectable in the still image recording mode.

Figure 4:
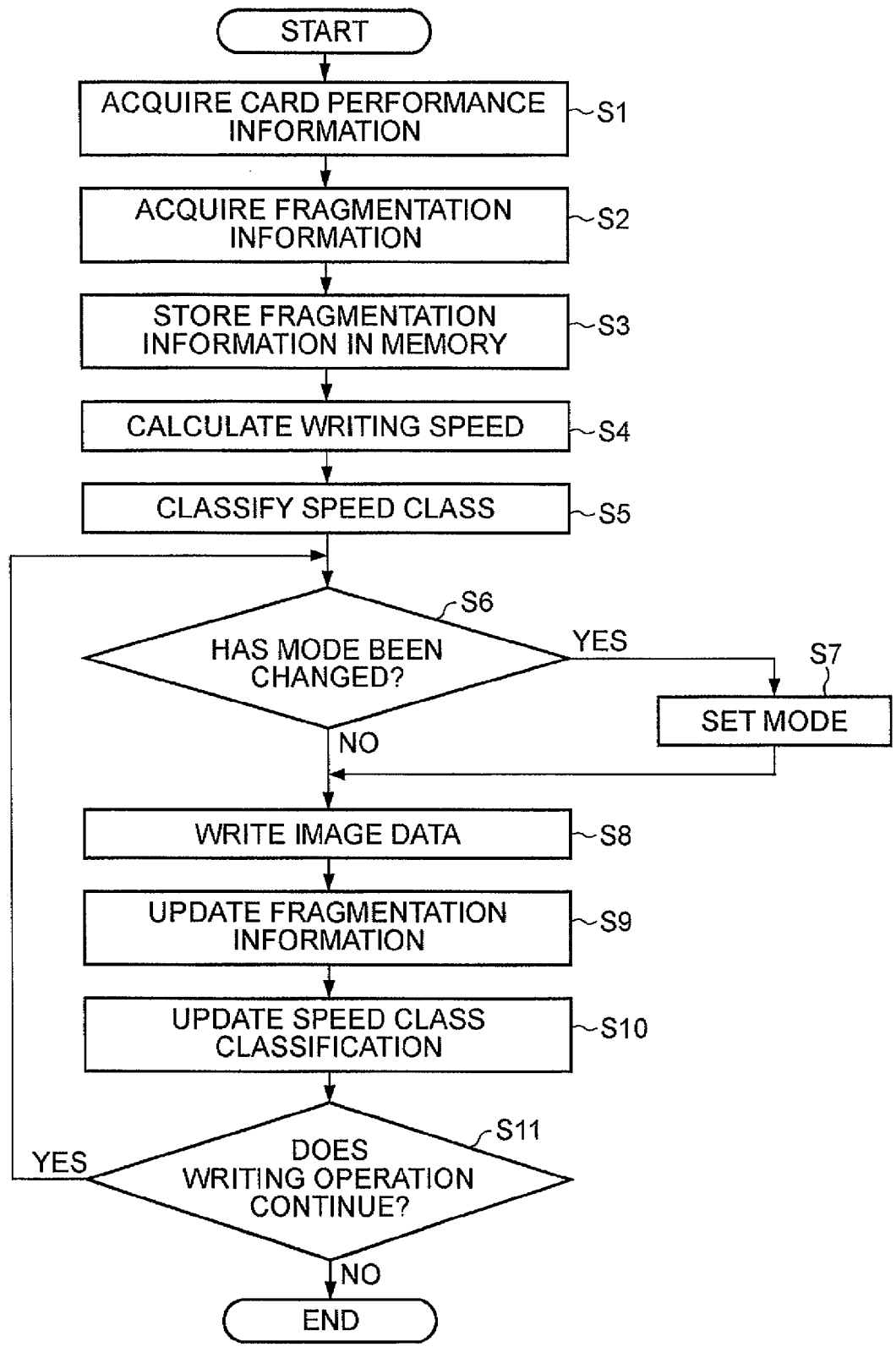
FIG. 4 is a flowchart showing an exemplary process of a writing operation according to an aspect of the present invention.
Figures 7B, 7C:
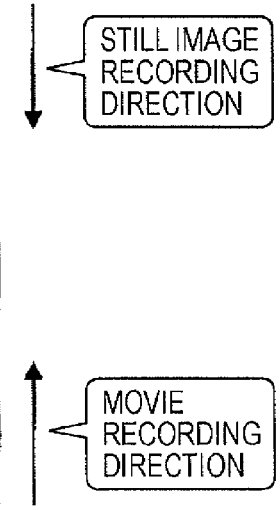

Referring to FIG. 4, an exemplary process of a writing operation of movies and still images will be described next. FIG. 4 is a flowchart showing the process of the writing operation in this exemplary embodiment.

Setting the operation mode switch shown in FIG. 2 at the modes except for "OFF (power off)" causes electric power to be supplied to the digital camera 10. If electric power is supplied to the digital camera 10 equipped with the memory card 24, the digital camera 10 starts mounting the file system on the memory card 24. Alternatively, as soon as the memory card 24 is inserted into the digital camera 10, the digital camera 10 starts mounting the file system on the memory card 24. That is, the digital camera 10 can access the memory card 24 only when supplied with electric power and equipped with the memory card 24.

When the memory card 24 is accessible and the operation mode switch is set at the movie recording mode or the still image recording mode, the digital camera 10 acquires the write performance information of the memory card 24 from the registers of the memory card 24 (at STEP S1). In addition, the digital camera 10 acquires the fragmentation information of the file system on the memory card 24 (at STEP S2). The memory in the area management unit 32 then stores and maintains the write performance and fragmentation information acquired at STEPs S1 and S2 (at STEP S3).

On the basis of the write performance and fragmentation information maintained in the memory, the area management unit 32 calculates a writing speed for each block in the memory card 24 (at STEP S4). The area management unit 32 then classifies the blocks into a plurality of speed classes based on the calculated writing speed (at STEP S5).

Now, referring to FIG. 5, an exemplary classification process of blocks into the plurality of speed classes is described. FIG. 5 is an example of the classification of the writing speed classes according to this exemplary embodiment. It is noted that the writing speeds are classified into "low-speed", "middle-speed", and "high-speed". The "low-speed" blocks are capable of recording data at approximately 2 Mbps. Thus, the "low-speed" blocks may be used for recording movies shot in the "ECONOMY" mode as well as still images. Since still images do not require real-time processing, the "low-speed" blocks are set as the default recording destination (i.e., preferential recording destination) of the still images. The "middle-speed" blocks are capable of recording data at approximately 4 Mbps. Thus, the "middle-speed" blocks are preferentially used for recording movies shot in the "NORMAL" mode. In addition, the "high-speed" blocks are capable of recording data at approximately 8 Mbps, and are preferentially used for recording movies shot in the "FINE" mode.

As described above, although the movie recording modes of "FINE", "NORMAL", and "ECONOMY" are selectable, each recording mode is configured to automatically correspond to predetermined blocks. For example, the recording modes of "FINE", "NORMAL", and "ECONOMY" correspond to the blocks classified into "high-speed", "middle-speed", and "low-speed", respectively. More specifically, for example, if a user selects the "FINE" movie recording mode, the "high-speed" blocks shown in FIG. 5 are preferentially used, and the compressed movie data is recorded in the unused clusters thereof. However, as described above, the "NORMAL" mode is selected in the default movie recording mode. Thus, the "middle-speed" blocks are preferentially used, and the compressed movie data is recorded in the unused clusters thereof.

For convenience of explanation, although the writing speeds are classified into 2 Mbps, 4 Mbps, and 8 Mbps in this exemplary embodiment, the present invention is not intended to be limited to these classes. For example, the writing speeds may be classified into 1.5 Mbps, 3 Mbps, and 6 Mbps. In addition, the speed classes depend on memory capacity and the FAT format. Thus, the combination of the speed classes is not limited to one kind. Additionally, although three kinds of image quality mode, namely, "FINE", "NORMAL", and "ECONOMY", and three kinds of speed class, namely, "high-speed", "middle-speed", and "low-speed", are provided herein, two kinds or four kinds or more of mode and class may be provided.

Referring back to FIG. 4, after classifying each block as "high-speed", "middle-speed", or "low-speed" at STEP S5, the digital camera 10 determines whether the mode has been changed or not (at STEP S6). More specifically, at STEP S6, the digital camera 10 stands by for the user's selection of the recording modes such as "movie shooting mode" and "still image shooting mode", or the image quality modes such as "FINE", "NORMAL", and "ECONOMY". At the same time, the digital camera 10 prepares for the writing operation to the memory card 24 (at STEP S6). If the user has changed the mode at STEP S6 (YES at STEP S6), the setting operation is performed according to the user's input (at STEP S7). More specifically, at STEP S7, the user can reselect "movie shooting mode" or "still image shooting mode" by rotating the operation mode switch. Alternatively, regarding the movie recording mode, the user can select a different image quality mode among "FINE", "NORMAL", and "ECONOMY" by accessing the menu screen.

If the user does not change the recording mode at STEP S6 (No at STEP S6) or after performing STEP S7, the process proceeds to the steps of recording the captured image. The image data captured, compressed, and encoded is supplied to the memory card 24. At this time, in the default setting, the still image data is written in the unused clusters in the "low-speed" blocks. In contrast, the movie data is written in the blocks classified as "high-speed", "middle-speed", or "low-speed" (at STEP S8). According to the default setting in the movie recording mode, the image data is written in the unused clusters in the "middle-speed" blocks (at STEP S8).

If the user has changed the default image quality mode of the movie recording mode at STEP S7, the movie data is written in the blocks of the speed class corresponding to the changed image quality mode. More specifically, if the user has changed the movie data bit rate setting to "FINE", the movie data is written in the unused clusters in the "high-speed" blocks (at STEP S8). If the user has changed the bit rate setting to "ECONOMY", the movie data is written in the unused clusters in the "low-speed" blocks (at STEP S8). Additionally, if the user has changed the bit rate setting to "NORMAL" after setting another bit rate, the movie data is written in the unused clusters in the "middle-speed" blocks (at STEP S8).

After writing the movie data having a predetermined size into the memory card 24, the area management unit 32 updates the fragmentation information stored in its memory based on the latest fragmentation state of the memory card 24 (at STEP S9). Along with this update, the classification of the speed classes is also updated (at STEP S10). Meanwhile, regarding the still images, the predetermined size is the size corresponding to one frame.

Then, the digital camera 10 determines whether the writing operation to the memory card 24 continues or not (at STEP S11). More specifically, when the operation mode is continuously set to the movie shooting mode or the still image shooting mode, the digital camera 10 determines that the writing operation to the memory card 24 continues (YES at STEP S11), and the process returns to STEP S6. If the operation mode is changed to the playback mode or power off mode, the digital camera 10 determines that the writing operation to the memory card 24 does not continue (NO at STEP S11), and the writing operation ends.

Now, referring to FIGS. 6A, 6B, and 6C, an explanation is given on the change of the speed classes before and after the writing operation of the movie data. FIG. 6A shows the speed classes of a recording medium before writing the movie data. FIG. 6B shows the speed classes after writing the 3 Mbps movie data according to a known method. FIG. 6C shows the speed classes after writing the 3 Mbps movie data according to a method of this exemplary embodiment.

As shown in FIG. 6A, suppose, for example, the writing speed varies for each recording block due to fragmentation that occurred in the memory card. In the known art, as shown in FIG. 6B, the 3 Mbps movie data is recorded in successive free blocks (i.e., the shaded area) of such a memory card. On the other hand, in this exemplary embodiment, as shown in FIG. 6C, the movie data is preferentially recorded in the "middle-speed" blocks, and also recorded in the "high-speed" blocks when no "middle-speed" blocks are available (i.e., the shaded area). It is apparent from comparison of FIG. 6B and FIG. 6C that only one free "high-speed" block remains in the known art, whereas three free "high-speed" blocks remain in the exemplary embodiment. That is, the exemplary embodiment utilizes more "middle-speed" blocks than the known art, thus allowing more "high-speed" blocks to be left. Accordingly, such an exemplary embodiment can implement a longer recording time of data requiring real-time processing as well as efficient utilization of recording media.

In the above exemplary embodiments, the method for determining the recording position on the basis of the bit rate that is set on the menu screen of the movie recording mode has been described. However, the present invention is not limited to this method, and may be configured to automatically identify the bit rate of the input image data, thereby determining the recording position.

In addition, in the above exemplary embodiments, a memory card is used as an example recording medium. Nevertheless, the present invention can be implemented likewise using a disc medium such as a hard disk, an optical disc, or the like.

The above embodiments have been merely shown as examples embodying the present invention and the technical scope of the present invention should not be limitedly interpreted by them. That is, the present invention can be practiced in various forms without departing from the spirit of the present invention or the main features thereof.

This application claims the benefit of Japanese Application No. 2005-234746 filed Aug. 12, 2005, which is hereby incorporated by reference herein in its entirety.

What is claimed is:

1. An image data recording apparatus, comprising:
   a recording medium information acquiring unit configured to acquire information regarding free space on a recording medium;
   a classifying unit configured to classify the free space into a plurality of classes according to a writing speed; and
   a recording unit configured to record image data in the free space on the recording medium on the basis of a bit rate of the image data to be recorded and the class classified by the classifying unit, wherein
   the image data includes movie data, and
   when there are a plurality of classes having the writing speed matching the bit rate of the movie data, the recording unit records the movie data in each of the free spaces so that the classes of the writing speed are arranged in an order from slow to high.

2. The apparatus according to claim 1, wherein the classifying unit classifies the free space into at least three classes.

3. The apparatus according to claim 1, wherein the classifying unit classifies the free space into low-speed, middle-speed, and high-speed classes.

4. The apparatus according to claim 3, wherein the image data further includes still image data and is recorded in a free space in the class classified as low-speed.

5. The apparatus according to claim 3, wherein the recording unit preferentially records the movie data in a free space in the class classified as middle-speed.

6. The apparatus according to claim 1, wherein the recording unit changes the class where the movie data to be recorded according to the change of the bit rate.

7. An image data recording apparatus, comprising:
   a recording medium information acquiring unit configured to acquire information regarding free space on a recording medium;
   a classifying unit configured to classify the free space into a plurality of classes according to a writing speed; and a recording unit configured to record image data in the free space on the recording medium on the basis of an image quality mode set for the image data to be recorded and the class classified by the classifying unit, wherein
the image data includes movie data, and
when there are a plurality of classes having the writing speed matching the image quality mode of the movie data, the recording unit records the movie data in each of the free spaces so that the classes of the writing speed are arranged in an order from slow to high.

8. The apparatus according to claim 7, wherein
the image data further includes still image data and is recorded in a free space in the class classified as low speed.

9. The apparatus according to claim 7, wherein
the classifying unit classifies the free space into low-speed, middle-speed, and high-speed classes.

10. The apparatus according to claim 9, wherein
the recording unit preferentially records the movie data in a free space in the class classified as middle-speed.

11. The apparatus according to claim 7, wherein
the recording unit changes the class where the movie data to be recorded according to the change of the image quality mode.

12. The apparatus according to claim 7, further comprising:
an image capturing unit configured to capture a subject and generate the image data; and
a setting unit configured to set the image quality mode for the image data captured by the image capturing unit,
wherein the recording unit records the captured image data in the free space on the recording medium on the basis of the image quality mode set for the captured image data and the class classified by the classifying unit.

13. An image data recording method utilized in an image data recording apparatus, the method comprising:
acquiring information regarding free space on a recording medium;
classifying the free space into a plurality of classes according to a writing speed; and
recording image data in the free space on the recording medium on the basis of a bit rate of the image data to be recorded and the class classified in the classifying step, wherein
the image data includes movie data, and
when there are a plurality of classes having the writing speed matching the bit rate of the movie data, the recording includes recording the movie data in each of the free spaces so that the classes of the writing speed are arranged in an order from slow to high.

14. An image data recording method utilized in an image data recording apparatus, the method comprising:
acquiring information regarding free space on a recording medium;
classifying the free space into a plurality of classes according to a writing speed; and
recording image data in the free space on the recording medium on the basis of an image quality mode set for the image data to be recorded and the class classified by the classifying step, wherein
the image data includes movie data, and
when there are a plurality of classes having the writing speed matching the image quality mode of the movie data, the recording includes recording the movie data in each of the free spaces so that the classes of the writing speed are arranged in an order from slow to high.

15. A computer-readable medium containing computer-executable instructions for recording image data utilized in an image data recording apparatus, the medium comprising:
computer-executable instructions for acquiring information regarding free space on a recording medium;
computer-executable instructions for classifying the free space into a plurality of classes according to a writing speed; and
computer-executable instructions for recording image data in the free space on the recording medium on the basis of one of an image quality mode set for the image data to be recorded, a bit rate of the image data to be recorded, and the class classified in the classifying step, wherein
the image data includes movie data, and
when there are a plurality of classes having the writing speed matching one of the bit rate and the image quality mode of the movie data, the recording includes recording the movie data in each of the free spaces so that the classes of the writing speed are arranged in an order from slow to high.

16. An image data recording apparatus, comprising:
a recording medium information acquiring unit configured to acquire information regarding free space on a recording medium and information regarding a writing speed of the free speed;
a determining unit configured to determine recording position on the recording medium on the basis of the information and a bit rate of the image data to be recorded; and
a recording unit configured to record image data at the determined recording position on the recording medium, wherein
the image data includes movie data, and
when there are a plurality of free spaces having the writing speed matching the bit rate of the movie data, the determining unit determines the recording position in each of the free spaces so that the classes of the writing speed are arranged in an order from slow to high.

17. An image data recording method utilized in an image data recording apparatus, the method comprising:
acquiring information regarding free space on a recording medium and information regarding a writing speed of the free speed;
determining recording position on the recording medium on the basis of the information and a bit rate of the image data to be recorded; and
recording image data at the determined recording position on the recording medium wherein
the image data includes movie data, and
when there are a plurality of free spaces having the writing speed matching the bit rate of the movie data, the determining the recording position in each of the free spaces so that the classes of the writing speed are arranged in an order from slow to high.

* * * * *